United States Patent [19]

Fowler

[11] 4,173,988
[45] Nov. 13, 1979

[54] PNEUMATICALLY ACTUATED THREAD PROTECTOR FOR PIPES

[75] Inventor: William P. Fowler, Weatherford, Tex.

[73] Assignee: Weatherford/Lamb Inc., Houston, Tex.

[21] Appl. No.: 876,608

[22] Filed: Feb. 10, 1978

Related U.S. Application Data

[63] Continuation-in-part of Ser. No. 825,329, Aug. 17, 1977, abandoned, which is a continuation-in-part of Ser. No. 792,286, Apr. 29, 1977, abandoned.

[51] Int. Cl.² ............................................ B65D 59/00
[52] U.S. Cl. ...................................................... 138/96 T
[58] Field of Search ...................... 138/96 T, 96 R, 93, 138/89, 30; 16/2, 108

[56] References Cited

U.S. PATENT DOCUMENTS

| 2,725,898 | 12/1955 | Stansbury | 138/96 T |
|---|---|---|---|
| 2,745,438 | 5/1956 | Bloom | 138/96 T |
| 3,459,230 | 8/1969 | Smith | 138/93 |
| 3,792,721 | 2/1974 | Zahid | 138/30 |
| 4,036,261 | 7/1977 | Hauk et al. | 138/96 T |

FOREIGN PATENT DOCUMENTS 1237248 6/1960 France .................... 138/96 T Primary Examiner—Lenard A. Footland
Attorney, Agent, or Firm—Fulbright & Jaworski

[57] ABSTRACT

A device for protecting external threads on the pin or male end of a tubular member such as drill pipe, tubing, casing, and the like (collectively referred to hereinafter as "pipe"). The thread protector includes a cylindrical inner sleeve including a cylindrical rigid member enclosed on one end by an overlapping end wall and open at the other end thereof, and further including a cylindrical expansible member in intimate contact with the exterior cylindrical surface of the rigid member. A cylindrical thread shield member is disposed concentrically around and outwardly spaced from the inner sleeve such that an annulus is formed to receive the threaded segment of the pipe. Valve means for inflating and deflating the expansible member communicate through an upper end of the thread shield member and the upper end of the rigid member to the inner cylindrical surface of the expansible member such that the expansible member is urged toward and into contact with the received pipe and in turn may be disengaged therefrom.

12 Claims, 1 Drawing Figure

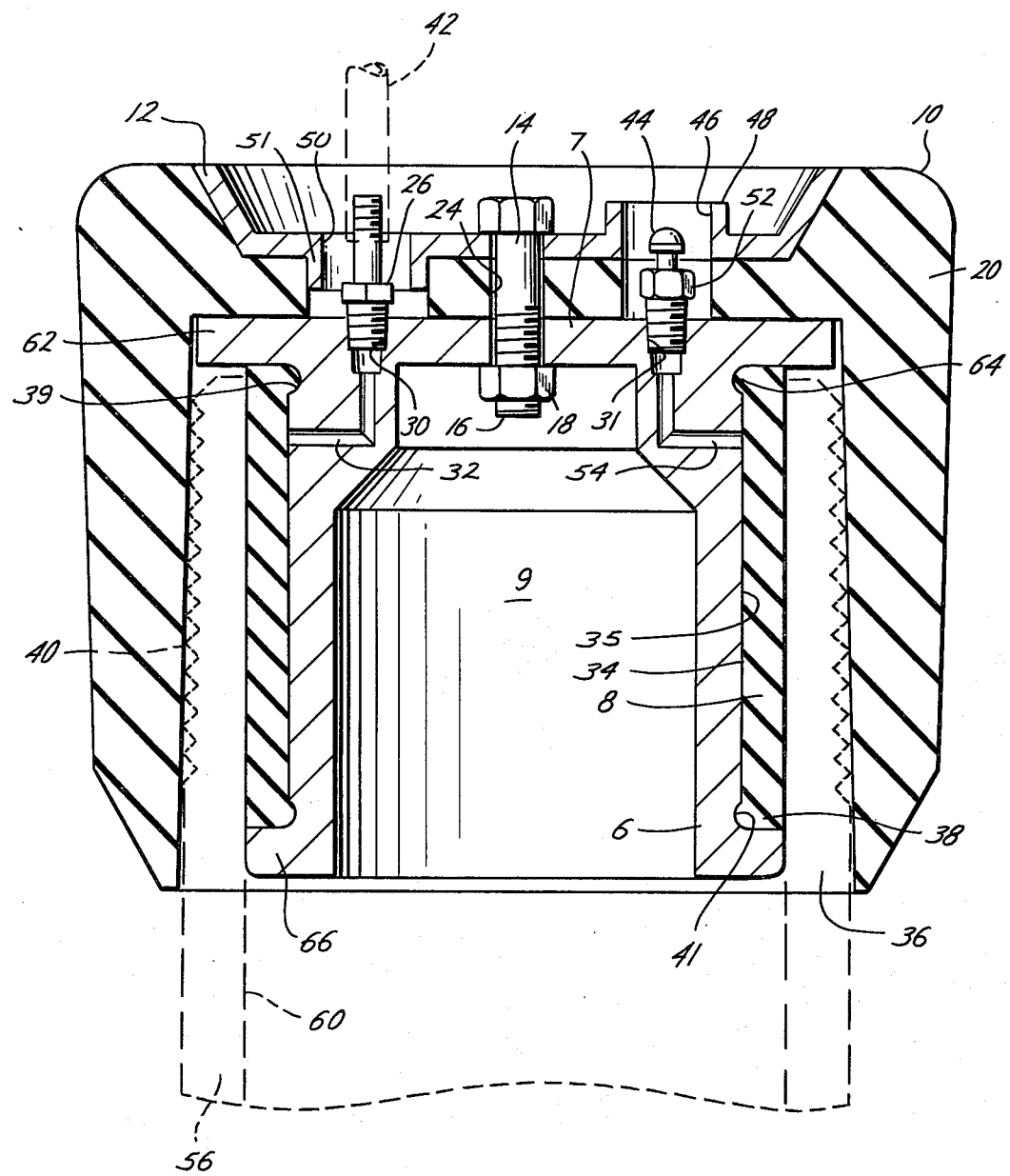

PNEUMATICALLY ACTUATED THREAD PROTECTOR FOR PIPES

CROSS-REFERENCES TO RELATED APPLICATIONS

This application is a continuation-in-part of application Ser. No. 825,329, filed Aug. 17, 1977, abandoned, which was a continuation-in-part of application Ser. No. 792,286, filed Apr. 29, 1977, abandoned, for Pneumatically Actuated Thread Protector for Pipes by William Price Fowler, for which Applicant claims priority for this application.

BACKGROUND OF THE INVENTION

External or male threads of pipe must be protected against damage during movement such as by dragging of the pipe during handling and positioning in and about derrick areas in the course of drilling oil and gas wells. For example, pipe is typically stored in a ground level racking area adjacent the derrick. Prior to being transported to the derrick floor, shipping protectors are removed from threads of the pipe to permit thorough cleaning of the pipe and coupling followed by application of fresh thread compound. Then the coupling end of the pipe is hoisted into a vertical position in the derrick while the pin end of the pipe is dragged along a rack walkway and inclined ramp leading to the derrick floor. Unless the threads on the casing end, particularly the male end of the casing, are protected, they may be severly damaged thereby requiring reconditioning and, in any event, a slowdown of operations by having to remove the pipe from the drilling area and repeat the process. Thus, thread protectors are used to protect the threads of the pipe while being transported to the derrick floor, and these protectors must be quickly attached and detached from the pipe yet not be knocked off during movement of the pipe. In addition, the protectors must be capable of being reused repeatedly.

Many forms of thread protectors have been employed including devices that are forced-fitted to the ends of the pipe or other tubular members, devices that are attached to the pipe ends by means of mechanical linkages and devices that are attached to the pipe ends of means of pneumatic expansion of resilient members. The present invention is directed to an improvement in the latter type of protector device and a method of manufacture thereof.

PRIOR ART STATEMENT

Pertinent prior art is that found in U.S. Pat. No. 2,745,438, granted May 15, 1956, to D. F. Bloom, which employs a pneumatically expansible doughnut-shaped tube. Upon expansion, the tube engages the internal surface of the pipe to secure the protector device about the end of the pipe. An outer sleeve in the form of a rigid cylindrical shell engages about and protects the threads on the exterior surface of the pipe. Valve means for inflating and deflating the bladder are provided. A disadvantage of the Bloom device is that the rigid outer shell or sleeve can be dented, broken or otherwise damaged in the environment of a derrick operation. Also, the Bloom device provides no means for frictional contact of the expandible bladder with the internal surface of the pipe to be protected so as to securely anchor the device to the pipe.

U.S. Pat. No. 2,725,898, granted Dec. 6, 1955, to M. H. Stansbury, discloses a pipe guide and joint protector having a member that expands against the internal surface of pipe with valve means for inflation and deflation. There is, however, no external sleeve or shell for protecting the exterior threads of a pipe. Indeed, by its own language, the patent relates to a "means of enclosing the end of the pipe for the purpose of excluding large objects."

U.S. Pat. No. 2,729,245, granted Jan. 3, 1956, and assigned to Stansbury, Inc., discloses a pneumtically actuated pipe thread protector having a member which expands inwardly toward the exterior surface of a received pipe. The movable member is enclosed by a metal case which, even if treated for wear resistance, is subject to damage. The '245 device does not disclose an annulus 16 bondingly secured at each end thereof to the rings 12 and 13, thereby not producing a seal between the annulus and the rings until sufficient injection of air through the groove 21 has occurred. The present invention is further distinguished from the '245 patent in that the device in the '245 patent purports to seal the pipe in by means of two rings, wherein the present device operates so as to allow a substantial portion of the cylindrical wall of the expansible member as well as the entire interior cylindrical wall of the thread shield member to contact the received pipe thereby preventing the introduction of foreign matter as well as protecting the pipe from abrasion.

Applicant is aware of and indeed his assignee has marketed in the past thread protector devices sold under the mark "Prohawk" that encase pipe ends internally and externally with a pneumatically-inflated rubber bladder. The Prohawk device suffers the same disadvantage as the Bloom and Stansbury devices as well as employing a steel alloy outer shell which, even if heat-treated for wear resistance, is subject to damage.

Other pneumatically actuated thread protectors are disclosed in U.S. Pat. Nos. 2,732,864 and 3,858,613.

SUMMARY OF THE INVENTION

A principal object of the present invention is the provision of a pneumatically actuated thread protector functioning to protect externally threaded pipe.

A further object of the present invention is to provide such a thread protector that is quickly attached to and detached from the pipe and transportable to and from a derrick from a pipe storage area.

Yet another object of the present invention is the provision of such a device adapted particularly for the protection of threads on the pin or male end of tubular members such as pipes, drill collars, casing, tubing and the like, the protector device having a cylindrical thread shield member formed of resilient material for engagement about the threads.

An even further object of the present invention is to provide a lightweight pneumatically actuated thread protector for use with externally threaded pipe.

A still further object of the present invention is the provision of a pneumatically actuated thread protector for externally threaded pipe including an inner sleeve having a substantially hollow cylindrical rigid member enclosed on one end by an overlapping end wall and open at the other end and a cylindrical expansible member in contact with the cylindrical surface of the rigid member, the upper and lower lips of the expansible member bonded to the rigid member, a cylindrical thread shield member formed of a resilient material for engagement about the threads of the pipe, means for mounting the thread shield member to the inner sleeve and valve means for inflating and deflating the expansible member.

DESCRIPTION OF THE DRAWING

In the drawing forming a part of the disclosure herein,

The FIGURE is a side elevational view in section of the pneumatically actuated thread protector.

DESCRIPTION OF THE PREFERRED EMBODIMENT

Referring now to the drawing, the thread protector device 10 of the present invention functions to protect the threaded end of the pipe 56 (shown in dotted outline), and particularly a pipe having external threads 40. The thread protector device includes an inner sleeve having a rigid member 6 and a expansible member 8. The rigid member 6 is cylindrical having an upper end wall 7 terminating in a stop member 62, and having a rim 66 at the second end thereof through which communication to the chamber 9 occurs.

The expansible member 8 in the unexpanded position has an interior surface 34 in intimate contact with the exterior cylindrical surface 35 of the rigid member 6. An upper annular recess 39 and a lower annular recess 41 opening onto the exterior cylindrical surface 35 of the rigid member 6 receive a portion of the upper lip 64 and the lower lip 38, respectively, of the expansible member 8, thereby improving the seal between the lip 64 and the upper end wall 7 and the lower lip 38 and the rim 66.

A cylindrical thread shield member 20 is concentrically disposed about the inner sleeve such that an annulus 36 is provided between the inner sleeve and the thread shield member 20 for receiving a pipe 56 having threads 40. The thread shield member 20 is formed of a resilient material which is both protective of the pipe threads 40 received by the annulus 36 as well as wear-retardant and resistant to permanent deformation.

An inverted frusto-conical metal plate 12 defines a large recess in the upper end of the thread shield member 20. The thread shield member 20 is secured to the inner sleeve, by way of example and not by limitation, with a bolt 14 slidably received through aligned apertures 24 of metal plate 12, thread shield member 20, and upper end wall 7 of the rigid member 6, and extending into the chamber 9 at which point a fastening means such as a bolt 18 is threadedly applied to the threads 16 of the bolt 14. When the bolt 18 is sufficiently tightened, the metal plate 12 and the rigid member 6 are drawn together with a portion of the thread shield member 20 secured therebetween.

The metal plate 12 carries within it a first aperture 50 and a second aperture 46 in turn carrying an inflating valve means 26 and a deflating valve means 52 respectively. The valve means 26 is threadedly secured into a compatable aperture 30 in the rigid member 6. A valve 26 may be of any conventional type such as is commonly used with pneumatic tires to receive pressure from a conventional air source represented in dotted outline by reference character 42. The deflating valve means 52 is likewise received in an accommodating aperture 31 in the rigid member 6 and may be of any suitable form for a quick release air valve preferably having a readily accessible button 44 that may be pressed to release air through the valve 52.

The inflating valve 26 communicates through the rigid member 6 to the inner cylindrical surface 34 of the expansible member 8. As air is injected through the valve means 26 and passageway 32 to the inner cylindrical surface 34 of the expansible member 8 which is in intimate contact with the outer cylindrical surface 35 of the rigid member 6, the expansible member 8 is urged toward the pipe 56 received in the annular recess 36. The expansible member 8 contacts the inner surface 60 of the pipe 56 with sufficient force and friction to retain the pneumatically actuated thread protector 10 on the pipe in order to protect the threads 40. The upper lip 64 and the lower lip 38 of the expansible member 8 are received by the upper nnular recess 39 and lower annular recess 41 respectively. The lips 64 and 38 are vulcanized and bondingly secured to the upper end wall 7 and adjacent annular recess 39 and the rim 66 and adjacent annular recess 41 respectively. Accordingly, the air pressure received by the inflatable valve means 26 and conveyed through the passageway 32 is retained within an expanding area generally lying between the inner surface 34 of the expansible member 8, the outer cylindrical surface 35 of the rigid member 6, the upper annular recess 39 and the lower annular recess 41 thereby urging the expansible member 8 into engagement with the inner surface 60 of the pipe 56.

The deflating valve means 52 which is preferably actuated by a quick-release button 44 is threadedly received by an accommodating recess 31 in the upper end wall 7 in the rigid member 6. The deflating valve means 52 communicates through a passageway 54 in the rigid member 6 to the inner cylindrical surface 34 of the expansible member 8. Accordingly, pressurized air contained between the outer cylindrical surface 35 of the rigid member 6, the inner cylindrical surface 34 of the expansible member 8 and the lips 64 and 38 is exhausted through the passageway 54 and out the valve means 52 by actuating the button 44.

An inwardly projecting aperture wall 51 extends into the thread shield member 20 thereby defining an aperture 50 for the disposition of the inflatable valve means 26 while at the same time stabilizing the metal plate 12 against rotation and translation on the thread shield member 20. Conversely, an upperwardly projecting aperture wall 48 defines the aperture 46 carrying the deflating valve means 52 while tending to protect against inadvertent deflating of the thread protector 10 by accidental contact with the button 44.

Those skilled in the art will realize that the outer cylindrical surface of the rim 66 can be angled inwardly from the vertical in order to facilitate the guiding of the pipe 56 by effectively enlarging the annulus 36 at the point of initial entry by the pipe 56.

The expansible member 8, which is substantially in intimate contact with the rigid member 6, facilitates the quick activation of the thread protector 10 in that a reasonably small quantity of air under pressure need be applied to the inner surface 34 of the expansible member 8 to cause sufficient contact by the expansible member 8 with the inner surface 60 of the pipe 56. It is understood that the expansible member 8 need only be in proximity to the cylindrical wall of the rigid member 6 in order to hasten the engagement of the pipe 56 by the expansible member 8, with intimate contact being the optimum proximate position.

The stop member 62 projects sufficiently into the annulus 36 such that the pipe 56 will abut the stop member 62 if the pipe 56 is inserted sufficiently within the annulus 36.

The chamber 9 allows the operator to tighten the nut 18 on the bolt 14 while additionally reducing the weight of the thread protector 10 thereby increasing the ease of handling of the device. It will be understood by those skilled in the art that the diameter of the chamber 9 is determined by the necessary thickness and rigidity of the cylindrical wall of the rigid member 6 and the diameter of the walls necessary to accommodate a specific diameter of pipe. Accordingly, the chamber may take any number of sizes and shapes other than that shown in the drawing as a preferred embodiment. Because the standard oilfield pipe is manufactured in different weights, the inside diameter of a particular oilfield pipe may vary according to the thickness of the wall. Consequently, the outside diameter of the chamber 9 is appropriately selected to fit a standard oilfield pipe having a maximum thickness. Advantageously, either the inner sleeve or the thread shield member 20 may be replaced on the job in short order if damaged. For example, the thread shield member may be replaced by simply unbolting the nut 18 from the bolt 14 and replacing a new thread shield member onto the inner sleeve in reverse order. Similarly, the inner sleeve comprising the rigid member 6 and the expansible member 8 may be replaced by disengaging the nut 18 from the bolt 14, removing the inner sleeve, inserting a new inner sleeve, and reinserting the bolt 14 through the aligned apertures 24 such that the nut 18 can once again be tightened onto the bolt.

In the preferred embodiment, the thread protector 10 includes a thread shield member 20 boltingly secured to a cylindrical inner sleeve comprising a rigid member 6 having an upper end wall 7 and a resilient expansible member 8 in intimate contact with the outside cylindrical surface 35 of the rigid member 6. Approximately one-half inch of the expansible member 8 is vulcanized at the upper lip 64 and the lower lip 38 thereof such that the lips 64 and 38 are bonded to the rigid member 6. A chamber 9 is defined by the upper end wall 7 and the cylindrical portion of the rigid member 6 such that the securing means comprising a bolt 14 and a nut 18 is accessible through the chamber 9 while at the same time reducing the weight of the rigid member 6 and the overall weight of the thread protector 10.

The present invention, therefore, is well adapted to carry out the objects and attain the ends and advantages mentioned, as well as others inherent therein. While the presently preferred embodiments of the invention have been given for the purpose of disclosure, numerous changes in the details of construction, combination, shape, size and arrangement of parts may occur without departing from either the spirit or the scope of the invention.

What is claimed is:

1. A pneumatically actuated thread protector for externally threaded pipe, comprising:
    (a) an inner sleeve including,
        (i) a substantially cylindrical rigid member enclosed at a first end by an upper end wall and open at a second end thereof; and
        (ii) a substantially cylindrical expansible member having, when unexpanded, an interior cylindrical surface in intimate contact with the exterior cylindrical surface of the rigid member (i), the expansible member having an upper lip and a lower lip, said expansible member being inflatably engagable with an internal surface of the pipe;
    (b) a cylindrical thread shield member formed of a resilient material concentrically encircling the cylindrical inner sleeve (a) and spaced outwardly therefrom such that an annulus is provided between the inner sleeve (a) and said thread shield member to receive the end of the pipe;
    (c) means for mounting the thread shield member (b) to the inner sleeve (a); and
    (d) valve means for inflatably urging the expansible member into engagement with the pipe and for deflatably disengaging said expansible member from the pipe and wherein the upper lip and the lower lip of the expansible member (a) (ii) are each secured to the rigid member (a) (i) for sealing the expansible member thereto.

2. The apparatus of claim 1 wherein the thread shield member (c) has a recessed end wall, the recess accommodating the valve means (d).

3. The apparatus of claim 1 wherein the valve means (d) includes,
    (a) a first valve for admitting air to the interior cylindrical surface of the expansible member; and
    (b) a second valve for exhausting air from the interior cylindrical surface of the expansible member (a) (ii).

4. The apparatus of claim 1 wherein the means 1 (c) comprises boltingly securing the thread shield member to the inner sleeve.

5. The apparatus of claim 1 wherein the upper lip and the lower lip of the expansible member (a) (ii) are each vulcanized.

6. The apparatus of claim 5 wherein the rigid member (a) (i) has an upper annular recess and a lower annular recess, said annular recesses in communication with the exterior cylindrical surface of the rigid member such that the upper annular recess receives a portion of the vulcanized upper lip and said lower annular recess receives a portion of the vulcanized lower lip respectively of the expansible member (a) (ii).

7. A pneumatically actuated thread protector for externally threaded pipe comprising:
    (a) an inner sleeve including,
        (i) a substantially cylindrical hollow rigid member forming an open chamber therein, said rigid member enclosed at a first end by an upper end wall and substantially open at a second end thereof; and
        (ii) a substantially cylindrical expansible member having, when unexpanded, an interior cylindrical surface in intimate contact with the exterior cylindrical surface of the rigid member (i), said expansible member having an upper end and a lower end forming an upper lip and a lower lip respectively;
    (b) means for securing the upper lip and the lower lip to said rigid member;
    (c) a cylindrical thread shield member formed of a resilient material concentrically encircling the cylindrical inner sleeve (a) and spaced outwardly therefrom such that an annulus is provided between the inner sleeve (a) and said thread shield member to receive the end of the pipe;
    (d) means for mounting the thread shield member (c) to the inner sleeve (a); and
    (e) valve means for inflatably urging the expansible member into engagement with the pipe and for deflatably disengaging said expansible member from the pipe.

8. The apparatus of claim 7 wherein an upper annular recess in the outer cylindrical surface of the rigid member and a lower annular recess in the outer surface of the rigid member each receives a portion of the upper lip and lower lip respectively of the expansible member.

9. The apparatus of claim 8 wherein the means (b) comprises bondingly vulcanizing the upper lip into the upper annular recess and the lower lip into the lower annular recess.

10. The apparatus of claim 7 wherein the valve means (e) comprises:
  (a) a first valve for admitting air to the interior cylindrical surface of the expansible member (a) (ii), said first valve communicating through the rigid member to a segment of the interior cylindrical surface of the expansible member, said segment disposed between the upper lip and the lower lip of the expansible member; and
  (b) a second valve for exhausting air from the interior cylindrical surface of the expansible member (a) (ii), said second valve communicating through the rigid member to a segment of the interior cylindrical surface of the expansible member, said segment disposed between the upper lip and the lower lip of the expansible member.

11. The apparatus of claim 7 wherein the upper end wall of the rigid member extends radially outwardly beyond the upper lip of the expansible member thereby forming a stop member at one end of the annular recess.

12. The apparatus of claim 7 wherein the second end of the rigid member terminates in a rim projecting radially outwardly, said rim being in intimate contact with the lower lip of the expansible member and terminating in proximity to the exterior cylindrical surface of the expansible member.

* * * * *